United States Patent
Yang et al.

(10) Patent No.: US 12,423,634 B2
(45) Date of Patent: Sep. 23, 2025

(54) SYSTEMS AND METHODS FOR PRODUCT PRODUCTION MANAGEMENT, SERVERS AND STORAGE MEDIA

(71) Applicants: Beijing Zhongxiangying Technology Co., Ltd., Beijing (CN); BOE Technology Group Co., Ltd., Beijing (CN)

(72) Inventors: Haodong Yang, Beijing (CN); Yongliang Han, Beijing (CN); Jiankun Zhang, Beijing (CN); Guangyu Shao, Beijing (CN); Wenjuan Li, Beijing (CN); Hong Wang, Beijing (CN)

(73) Assignees: Beijing Zhongxiangying Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 15 days.

(21) Appl. No.: 17/764,833

(22) PCT Filed: May 28, 2021

(86) PCT No.: PCT/CN2021/096916
§ 371 (c)(1),
(2) Date: Mar. 29, 2022

(87) PCT Pub. No.: WO2022/246830
PCT Pub. Date: Dec. 1, 2022

(65) Prior Publication Data
US 2024/0046165 A1 Feb. 8, 2024

(51) Int. Cl.
*G06Q 10/0633* (2023.01)
*G06F 16/21* (2019.01)
(Continued)

(52) U.S. Cl.
CPC ....... *G06Q 10/0633* (2013.01); *G06F 16/213* (2019.01); *G06F 16/2379* (2019.01); *G06F 16/245* (2019.01)

(58) Field of Classification Search
CPC .. G06F 16/213; G06F 16/2379; G06F 16/245; G06Q 10/00; G06Q 10/06; G06Q 10/063; G06Q 10/0633
See application file for complete search history.

(56) References Cited

U.S. PATENT DOCUMENTS 5,299,115 A * 3/1994 Fields ................. G06Q 10/06
705/7.33
8,122,292 B2 * 2/2012 Nanjundaswamy .....................
G06F 11/3636
714/34
(Continued)

FOREIGN PATENT DOCUMENTS

CN 102654907 A 9/2012
CN 103258261 A 8/2013
(Continued)

OTHER PUBLICATIONS

PCT/CN2021/096916 international search report.

*Primary Examiner* — James E Richardson
(74) *Attorney, Agent, or Firm* — IPro, PLLC (57) ABSTRACT

A system and a method for product production management, a server and a storage medium are disclosed. The system includes: a production configuration module, configured to select a plurality of process nodes according to a user's selection operations, establish a connection relationship of the plurality of process nodes according to the user's connection operations, and obtain and display configuration data of a production process flow; a data acquisition module, configured to acquire product data in the production process flow and output the product data to a data storage module;
(Continued)

and the data storage module, configured to store the product data in a current data table and/or a historical data table according to a preset storage strategy when the product data matches the configuration data.

17 Claims, 6 Drawing Sheets

(51) Int. Cl.
*G06F 16/23* (2019.01)
*G06F 16/245* (2019.01)

(56) References Cited

U.S. PATENT DOCUMENTS

| | | | |
|---|---|---|---|
| 10,467,050 B1* | 11/2019 | Schmidgall | G06F 9/4881 |
| 2005/0154709 A1* | 7/2005 | Barsness | G06F 16/90335 |
| | | | 707/E17.14 |
| 2017/0140308 A1* | 5/2017 | Cano Zapata | G06Q 10/0633 |
| 2019/0163799 A1* | 5/2019 | Fujimoto | G06F 16/2282 |
| 2021/0150468 A1* | 5/2021 | Wright | G06Q 10/0838 |

FOREIGN PATENT DOCUMENTS

| | | |
|---|---|---|
| CN | 104504505 A | 4/2015 |
| CN | 108319998 A | 7/2018 |
| CN | 111798126 A | 10/2020 |
| CN | 111798128 A | 10/2020 |

* cited by examiner

SYSTEMS AND METHODS FOR PRODUCT PRODUCTION MANAGEMENT, SERVERS AND STORAGE MEDIA

CROSS REFERENCE TO RELATED APPLICATIONS

The present application is a US national phase of International patent application No. PCT/CN2021/096916 filed on May 28, 2021, the contents of which are incorporated here in its entirety by reference.

TECHNICAL FIELD

The present disclosure relates to the technical field of product production management, in particular to systems and methods for product production management, a servers, and storage media.

BACKGROUND

At present, in the field of industrial product production, different processes, which are operated by different equipment and different personnel, will be adopted for different products. Any subtle problems in any link will cause problems in final industrial products. Therefore, it is necessary to record the production process flow of each industrial product, so as to provide a basis for subsequent product defect analysis.

However, the amount of data generated in the production process flows is relatively large, which increases the difficulty of managing product data.

SUMMARY

The present disclosure provides systems and methods for product production management, servers, and storage media, so as to solve the deficiencies of the related art.

According to a first aspect of embodiments of the present disclosure, there is provided a system for product production management, including: a production configuration module, a data acquisition module and a data storage module, where
  the production configuration module is configured to select a plurality of process nodes according to a user's selection operations, establish a connection relationship of the plurality of process nodes according to the user's connection operations, and obtain and display configuration data of a production process flow;
  the data acquisition module is configured to acquire product data corresponding to the plurality of process nodes in the production process flow and output the product data to the data storage module; and
  the data storage module is configured to store the product data in a current data table and/or a historical data table according to a preset storage strategy when the product data matches the configuration data.

Optionally, the data storage module is configured to store the product data in the current data table and/or the historical data table according to the preset storage strategy includes: the data storage module is configured to
  acquire time of the product data; and
  simultaneously store the product data in the current data table and the historical data table, and clear data of a previous storage period in the current data table when a new storage period begins,
  where the current data table and the historical data table are both sized according to a set period, and the set period is greater than the storage period.

Optionally, the data storage module is configured to store the product data in the current data table and/or the historical data table according to the preset storage strategy includes: the data storage module is configured to
  acquire the product data and store the product data in the current data table;
  determine whether production of a product has been completed according to the product data;
  determine a table name of a historical data table corresponding to product ID data of the product when the production of the product has been completed, where the completion of the production of the product means that all production process flows of a single product have been completed and all production process flows for a batch including the single product have been completed; and
  when set time is reached, store the product data in the historical data table corresponding to the table name and delete the product data from the current data table at the same time.

Optionally, the data storage module is configured to determine the table name of the historical data table corresponding to the product ID data of the product includes: the data storage module is configured to
  acquire a first numerical value at a first preset position in the product ID data;
  convert the first numerical value to a second numerical value; and
  take data at a second preset position in the second numerical value as a suffix of the historical data table, so as to obtain the historical data table corresponding to the product ID data.

Optionally, the data storage module is configured to store the product data in the current data table and/or the historical data table according to the preset storage strategy includes: the data storage module is configured to
  reduce a storage period for deleting the product data from the current data table when data amount in a current data table exceeds a first data amount threshold.

Optionally, the data storage module is further configured to change a creation rule for creating a data table to increase a number of the historical data table when data amount in a current historical data table exceeds a second data amount threshold; and reduce data amount corresponding to a single historical data table.

Optionally, the data query module is configured to, in a product traceability process, query for product data in the current data table according to product ID data; and query a corresponding historical data table according to the product ID data and the preset storage strategy when the query fails, so as to obtain a traceability result.

Optionally, the data query module is configured to, in a process of Working In Process (WIP) query, query for product data corresponding to product ID data in the current data table.

Optionally, the data query module is configured to, in a historical query process, query for product data in the current data table according to query conditions, and return the found product data; and when the product data is not found, determine a historical data table in which product data is included, query for the product data in the historical data table according to the query conditions, and return the found product data.

According to a second aspect of the embodiments of the present disclosure, there is provided a method for product production management, including:

selecting a plurality of process nodes according to a user's selection operations and establishing a connection relationship of the plurality of process nodes according to the user's connection operations, obtaining and displaying configuration data of a production process flow;

acquiring product data corresponding to the plurality of process nodes in the production process flow; and storing the product data in a current data table and/or a historical data table according to a preset storage strategy when the product data matches the configuration data.

Optionally, storing the product data in the current data table and/or the historical data table according to the preset storage strategy includes:

acquiring time of the product data; and simultaneously storing the product data in the current data table and the historical data table, and clearing data of a previous storage period in the current data table when a new storage period begins, where the current data table and the historical data table are both sized according to a set period, and the set period is greater than the storage period.

Optionally, storing the product data in the current data table and/or the historical data table according to the preset storage strategy includes:

acquiring the product data and storing the product data in the current data table;

determining whether production of a product has been completed according to the product data;

determining a table name of a historical data table corresponding to product ID data of the product when the production of the product has been completed, where the completion of the production of the product means that all production process flows of a single product have been completed and all production process flows for a batch including the single product have been completed; and when set time is reached, storing the product data in the historical data table corresponding to the table name and deleting the product data from the current data table at the same time.

Optionally, determining the table name of the historical data table corresponding to the product ID data of the product includes:

acquiring a first numerical value at a first preset position in the product ID data;

converting the first numerical value to a second numerical value; and taking data at a second preset position in the second numerical value as a suffix of the historical data table, so as to obtain the historical data table corresponding to the product ID data.

Optionally, storing the product data in the current data table and/or the historical data table according to the preset storage strategy includes:

reducing a storage period for deleting the product data from the current data table when data amount in a current current data table exceeds a first data amount threshold.

Optionally, the method further includes:

when data amount in a current historical data table exceeds a second data amount threshold, changing a creation rule for creating a data table to increase a number of the historical data table; and reducing data amount corresponding to a single historical data table.

Optionally, the method further includes:

in a product traceability process, querying for product data in the current data table according to product ID data; and querying a corresponding historical data table according to the product ID data and the preset storage strategy when the query fails, so as to obtain a traceability result.

Optionally, the method further includes:

in a process of Working In Process (WIP) query, querying for product data corresponding to product ID data in the current data table.

Optionally, the method further includes:

in a historical query process, querying for product data in the current data table according to query conditions, and returning the found product data; and when the product data is not found, determining a historical data table in which product data is included, querying for the product data in the historical data table according to the query conditions, and returning the found product data.

According to a third aspect of the embodiments of the present disclosure, there is provided a server, including:

a processor; and a memory configured to store a computer program executable by the processor, where the processor is configured to execute the computer program in the memory to implement the method for product production management according to any one of the above.

According to a fourth aspect of the embodiments of the present disclosure, there is provided a computer readable storage medium, when an executable computer program in the computer readable storage medium is executed by a processor of an electronic device, the method for product production management according to any one of the above can be realized.

As can be seen from the above embodiments, in the solutions provided by the embodiment of the present disclosure, the production configuration module may select a plurality of process nodes according to a user's selection operations, establish a connection relationship of the plurality of process nodes according to the user's connection operations, and obtain and display configuration data of a production process flow; the data acquisition module may acquire product data corresponding to the plurality of process nodes in the production process flow and output the product data to the data storage module; and the data storage module may store the product data in a current data table and/or a historical data table according to a preset storage strategy when the product data matches the configuration data. In this way, part of the product data is stored in the historical data table in the embodiments, so that the amount of product data in the current data table is relatively small, and thus the query efficiency can be improved.

It should be understood that the above general description and the following detailed description are exemplary and explanatory only, and do not limit the present disclosure.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The exemplary embodiments described below do not represent all embodiments consistent with the present disclosure. Rather, they are merely examples of device consistent with some aspects of the present disclosure, as recited in the appended claims.

Figure 1:
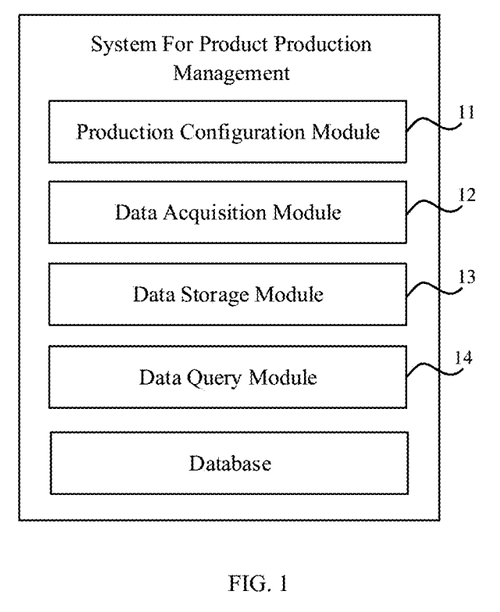
FIG. 1 is a block diagram illustrating a system for product production management according to an exemplary embodiment.
Figure 2:
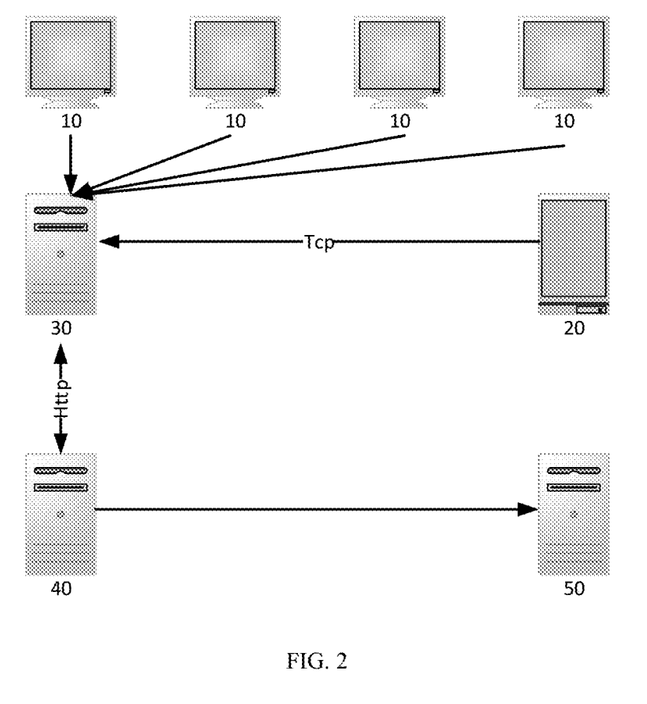
FIG. 2 is a block diagram illustrating another system for product production management according to an exemplary embodiment.

To solve the above-mentioned technical problems, embodiments of the present disclosure provide a system for product production management. FIG. 1 is a block diagram illustrating a system for product production management according to an exemplary embodiment, and FIG. 2 is a block diagram illustrating another system for product production management according to an exemplary embodiment. Referring to FIGS. 1 and 2, a system for product production management includes a production configuration module 11, a data acquisition module 12 and a data storage module 13.

The production configuration module 11 is configured to select a plurality of process nodes according to a user's selection operations, establish a connection relationship of the plurality of process nodes according to the user's connection operations and obtain and display configuration data of a production process flow.

The data acquisition module 12 is configured to acquire product data corresponding to the plurality of process nodes in the production process flow and output the product data to the data storage module 13.

The data storage module 13 is configured to store the product data in a current data table and/or a historical data table according to a preset storage strategy when the product data matches the configuration data.

It should be noted that the product data refers to the data related to a product itself (such as which process node the product is in, the status of the product, good or bad product, and the like) and the data related to the process node (such as temperature and pressure in the production process, the working status of the process node, and the like).

It should be noted that the current data table and the historical data table are both sized according to a set period. The current data table refers to a data table that stores the product data according to a certain storage period. The duration of the above-mentioned storage period can be adjusted according to the production process flow, such as one day, one week or one month. The above-mentioned set period is greater than the above-mentioned storage period, such as one month, one year, or ten years, etc. The historical data table refers to a data table that stores the product data according to a set period. A new data table starts to be used after the set period is reached, and the old historical data table will be permanently stored.

In this embodiment, the production configuration module 11 may be provided in a site device 10. The site device 10 can achieve the effect of configuring data when executing the production configuration module 11.

In an example, the site device 10 may be implemented by a device such as a smart phone, a tablet computer, a touch screen, or a personal computer, and the number of the site device 10 may be set according to the requirements of respective sites on the product production line. A browser or a configuration program can be preinstalled in the site device. Taking a browser as an example, through which the production configuration module can be accessed, the production process flow of the product can be managed, and the product data can be managed, changed, and queried. In this embodiment, the production configuration module 11 can complete at least one of the following: site management, process registration, material management, product model management, work order generation, and site ID management.

Taking site management as an example, in this example, the production configuration module 11 can configure site information, such as name, operation, rules, and the like, into the system for product production management.

Figure 3:
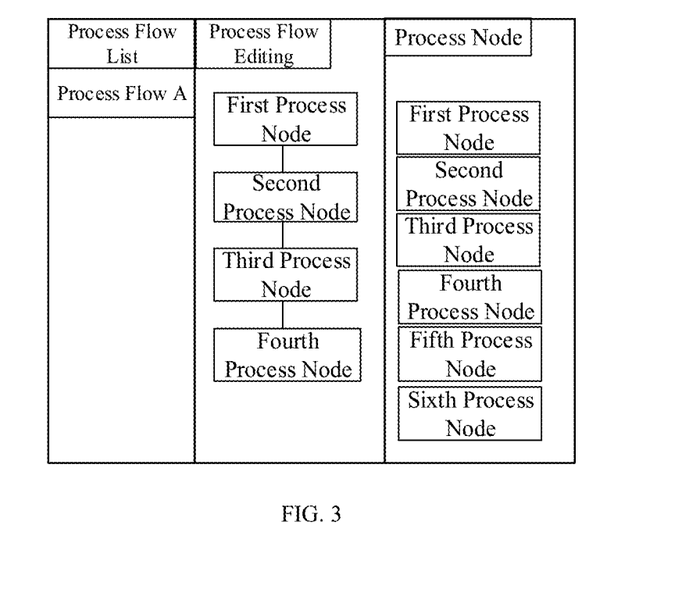
FIG. 3 is a schematic diagram illustrating the effect of creating a production process flow according to an exemplary embodiment.

Taking process registration as an example, in this example, the production configuration module 11 can perform process registration, for example, the production configuration module 11 can select the corresponding process nodes and the order of the process nodes, as well as the sites corresponding to respective process nodes and the order of the sites according to the actual production process flow. Referring to FIG. 3, after the process registration operation interface is opened, a plurality of process nodes are listed on the right side of the operation interface, such as a first process node, a second process node, . . . , and so on. The site device can determine the components that is, the process nodes, selected in the list when a user's selection operations are detected, and move the components to an editing area when drag operations are detected; and the production configuration module 11 establishes the connection relationship between the components by connecting lines when connection operations are detected. The order of the components in FIG. 3 is the first process node, the second process node, the third process node, and the fourth process node, so that the production configuration module 11 can obtain the configuration data of the production process flow, and can display the above configuration data.

Taking product model management as an example, the production configuration module 11 can select the production process flow of the product and set the packaging signal of the site. For example, the packaging signal may include the selection of product model, various contents of product-related signal, and the production process flow, so that the information of the product at each process node can be conveniently configured.

Taking work order management as an example, the production configuration module 11 can display existing work order information. In addition, the production configuration module 11 can allow new work orders to be added through a NEW button at a specified position (e.g., the upper right corner of the interface). For example, after displaying the operation page for creating a work order, the production configuration module 11 can allow setting material number or product model information (FG Code), planned production quantity (PlanQty), planned completion time (such as start date and end date), etc.

Taking site ID generation as an example, the production configuration module 11 can generate relevant site ID data according to material information, site and the number of batches, and query for the generated site ID data according to query conditions. The query conditions may include at least one of the following: the current day, the current month, the current year, or customized.

It can be seen that, the product data can be managed, changed, and queried through the production configuration module 11 in this embodiment, and the operation is simple, which can improve management efficiency and operation experience.

In this embodiment, the data acquisition module 12 may be provided in the reading device 20. When the data acquisition module 12 is executed in the reading device 20, the data acquisition effect can be achieved. In an example, the reading device 20 may be implemented by a code scanner, a camera, an audio collector or other devices. Taking a code scanner as an example for the reading device 20, product data such as QR code or bar code can be set on the product, and the above-mentioned product data can be collected, so as to achieve the effect of managing product data in the production process flow, such as product data entry, product defect detection, product sampling inspection, product re judgment or product repair, etc.

Taking product data entry as an example, the data acquisition module 12 can enter product ID data into the system for product production management, and then form a batch of a plurality of products through the packaging function.

Taking product defect detection as an example, the data acquisition module 12 can acquire data such as ID data of defective products, batch number of defective products, etc.

Taking product sampling inspection as an example, the data acquisition module 12 can acquire product data of some products in each batch of products in the product production process to complete sampling inspection.

Taking the product re judgment as an example, the data acquisition module 12 can acquire the misjudgment of the product to be defective in the product production process, which may be caused by misoperation and further confirm whether the product is defective.

Taking product repair as an example, the data acquisition module 12 can acquire data on unbinding materials in the product repair process or revising judgment. The data on unbinding materials refers to data on removing damaged materials and data on updating new materials, and the data on revising judgment refers to the data of whether the product is good or bad after the repair.

It can be seen that, the product data of the product in the production process, the sampling inspection process and the repair process is acquired through the data acquisition module 12 in this embodiment, so as to achieve the effect of obtaining complete product data and facilitate subsequent data management.

In this embodiment, the data storage module 13 may be provided in a front-end server 30, a back-end server 40 or a database server 50. When the front-end server 30, the back-end server 40 or the database server 50 runs the data storage module 13, the effect of data storage can be achieved. In an example, the above database can be implemented by a MYSQL database.

Taking it is configured in the back-end server as an example, the data storage module 13 can store the product data in a corresponding current data table or a historical data table according to the preset storage strategy. The preset storage strategy may include data precipitation time and data precipitation strategy.

Taking the data precipitation time as an example, in the product production process, different products may have different production process flows and production cycles, and different products in the same batch are different in the status, therefore, there are different standards for the evaluation of the completion of the product production process. In other words, the time when the data storage module 13 transfers the product data of the product from the current data table to the historical data table is to be set according to the actual scenario.

Taking the time-related data table as an example, this type of data table is only related to time. The data at different time points is not directly related, and the correlation between adjacent products is not close. Different product data can be distinguished according to time, that is, different product data can be stored in different time period tables according to the actual time correlation. In this example, the data tables in a data precipitation tank (that is, the historical database) can be divided according to the year; and the product data is simultaneously stored in the current data table and the historical data table when the product data is generated, and data of a previous day in the current data table is cleared on a new day, that is, the product data of the previous day in the current data table is cleared at the beginning of each day.

Figure 4:
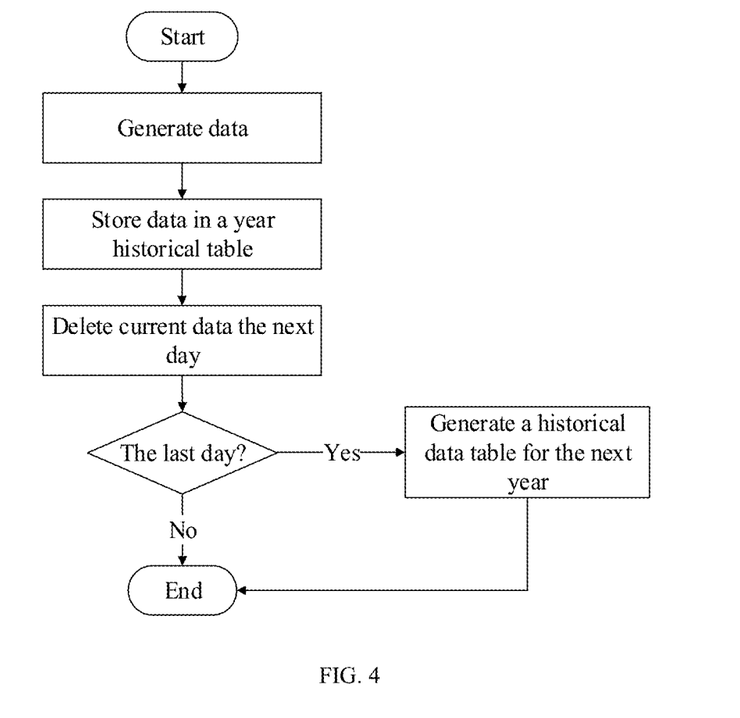
FIG. 4 is a flowchart illustrating data precipitation based on time series according to an exemplary embodiment.

Referring to FIG. 4, the back-end server can process time-related historical data tables by the following preset storage strategy. Firstly, the current data table and the historical data table for the current year are created, and the generated product data is stored in the current data table and the historical data table for the current year. A fixed time is selected to delete the current data generated on the previous day after one day (i.e. on the next day), that is, only the product data in the historical data table will be retained. Then, it is determined whether the current day is the last day of the current year; if it is the last day of the current year, a historical data table for the next year is to be created to store the next product data. It can be seen that the real-timeness and convenience of data storage can be improved in this embodiment.

Figure 5:
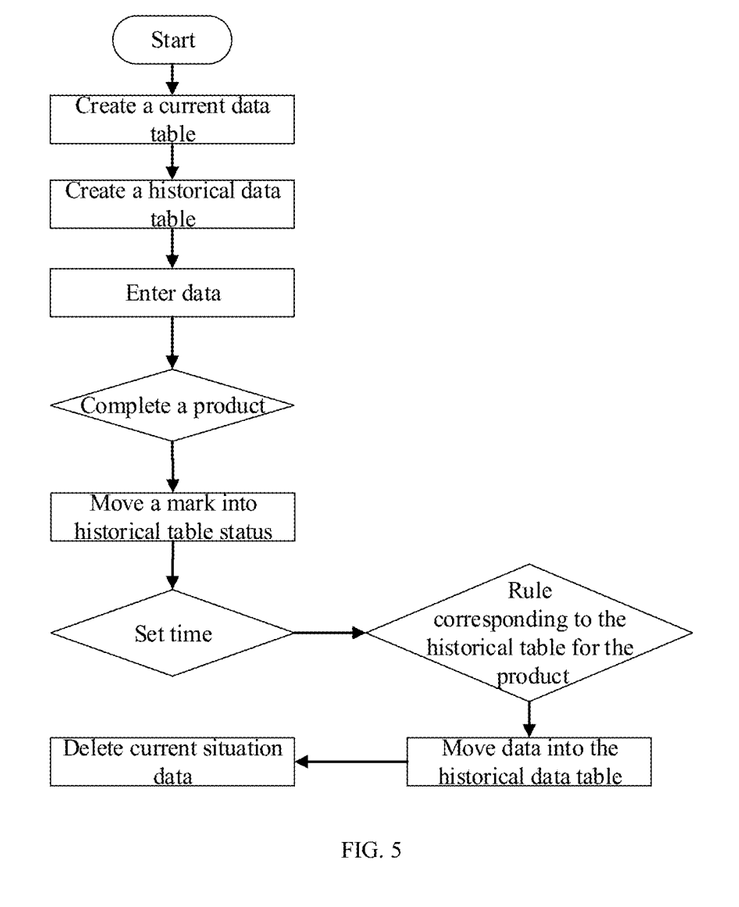
FIG. 5 is a flowchart illustrating data precipitation based on product type according to an exemplary embodiment.

Taking the product-related data table as an example, products pass through different processes and the product data of adjacent products is very closely related. In this case, the actual production requirements cannot be met if the historical data table is distinguished according to time. Referring to FIG. 5, in this example, the product data can be stored in the current data table first when the product data is acquired; then, it is determined whether production of the product has been completed according to the product data. When all production process flows of a single product have been completed and all production process flows for a batch including the single product have been completed, a table name of a historical data table corresponding to the product ID data of the product can be determined. When the set time is reached, the product data is stored in the historical data table corresponding to the table name and the above product data is deleted from the current data table at the same time, so as to achieve the effect of moving the product data from the current data table to the historical data table. It should be noted that the above set time can be set according to specific scenarios, and is used for product maintenance, after-sales maintenance, and product traceability after product production is completed.

The data storage module 13 determines the table name of the historical data table corresponding to the product ID data of the product, including: a first numerical value at a first preset position in the product ID data is acquired, such as the last letter. For example, if the product ID data is 0001A, the last letter is A. The first numerical value is converted to a second numerical value. Taking the conversion rule of converting to ASCII code as an example, the letter A can be converted to 67, and the conversion rule can be set according to the scenario. Finally, data at a second preset position (such as the last digit) in the second numerical value may be taken as a suffix of the historical data table, so as to obtain the historical data table corresponding to the product ID data of the product. For example, if the suffix corresponding to 67 is _7, "current data table _7" can be used as the table name of the historical data table that the product data should be stored in.

In this way, the product data is processed based on time or product by the preset storage strategy in this embodiment, so that product data in different scenarios can be processed and processing efficiency can be improved.

In an embodiment, the data storage module 13 can also upgrade the data tables in the system for product production management, including:

In an example, the maximum data amount of data stored in each current data table can be set as a first data amount threshold, and a storage period for deleting the product data from the current data table is reduced when data amount in a current current data table exceeds the first data amount threshold, for example, the set time is changed from 2 days to 1 day, or from 1 day to half a day. In this way, the data amount stored in the current data table will become smaller, which can realize the operation of the actual production task with a small amount of data, improve the production efficiency, and reduce the production defect rate caused by the system.

In another example, the maximum data amount of data stored in each historical data table can be set to a second data amount threshold. When data amount in a current historical data table exceeds the second data amount threshold, a creation rule for creating a data table is changed to increase a number of the historical data table; and data amount corresponding to a single historical data table is reduced, which can improve the performance of the system.

In an embodiment, the system for product production management further includes a data query module 14. To reduce the pressure on the system caused by the excessive amount of data in the product production process, the data in the current data table is moved into different historical data tables. Therefore, in product traceability, it must be considered the problem that whether the movement of some product data into the historical data table will cause traceability failure. In this case, in a product traceability process, the data query module 14 can first query for the product data in the current data table according to the product ID data; and query the corresponding historical data table according to the product ID data and the preset storage strategy when the query fails, so as to obtain a traceability result. It can be understood that the above data precipitation strategy can be used to determine the table name of the historical data table when querying the historical data table. In this way, in this embodiment, traceability is first performed in the current data table, which can meet traceability requirements in most cases and improve traceability efficiency; and traceability is then performed in the historical data table only when the query fails, which can ensure the success rate of traceability.

In an embodiment, the data query module 14 can query for the product data corresponding to the product ID data in the current data table during a process of Working In Process (WIP) query, for example, to query for the production progress and status of a certain product or a certain batch of products in actual production. The product data will not enter the historical data table until all the process flows are completed, thus, there is no need to correlate historical data when WIP query, and the corresponding product information can be found in the current data table according to the query conditions for display.

In an embodiment, in a historical query process, the data query module 14 can query for the product data in the current data table according to query conditions, and return the product data when the product data is found; and when the product data is not found, the data query module 14 can determine a historical data table in which the product data is included according to the preset storage strategy, query for the product data in the historical data table according to the query conditions, and return the product data. In this way, the historical query method provided in this embodiment can be applicable to the scenario where product data is in the current data table or has been moved into the historical data table, which is beneficial to improve the query effect or the accuracy of the query result.

Figure 6:
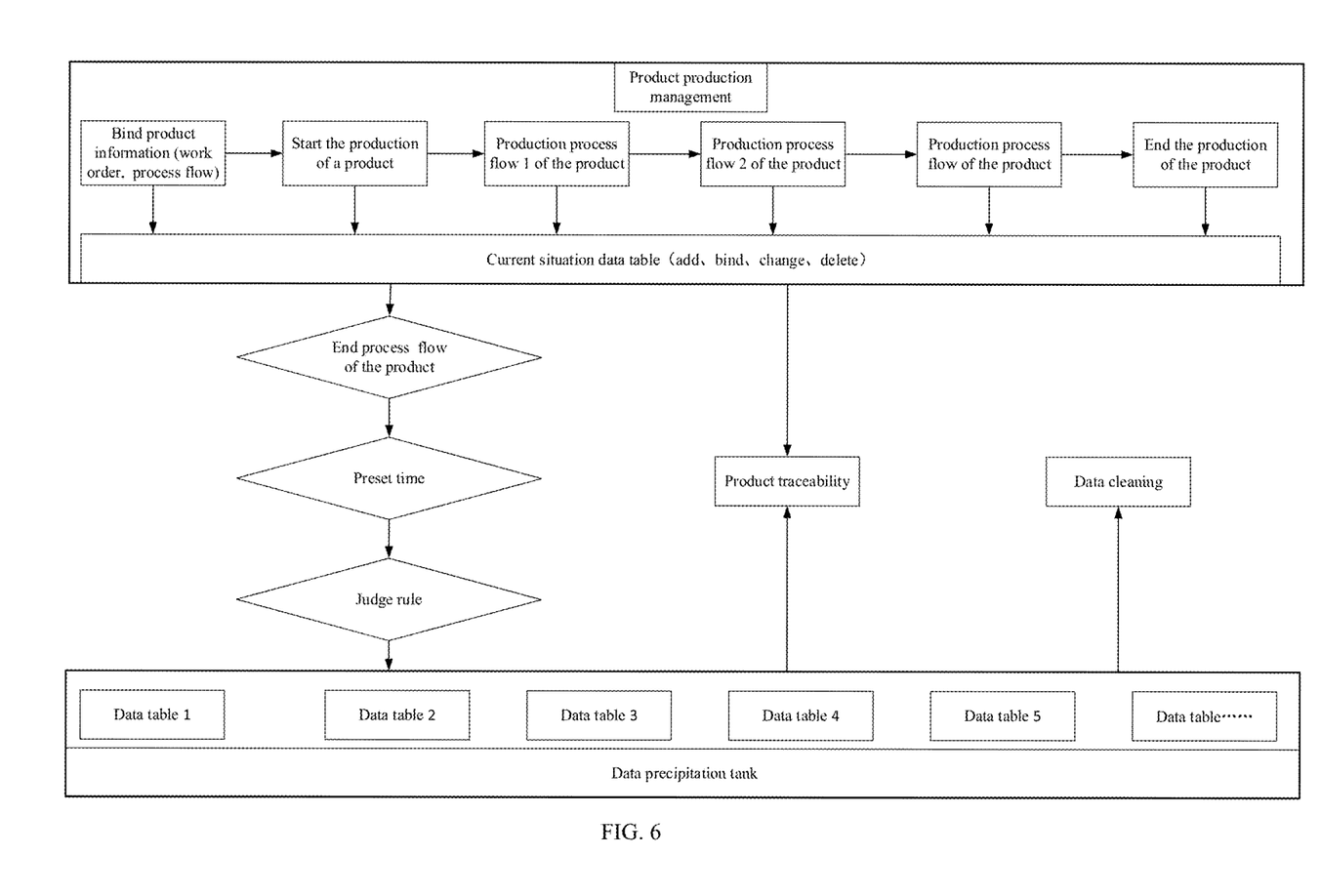
FIG. 6 is a flowchart illustrating a method for product production management according to an exemplary embodiment.
Figure 7:
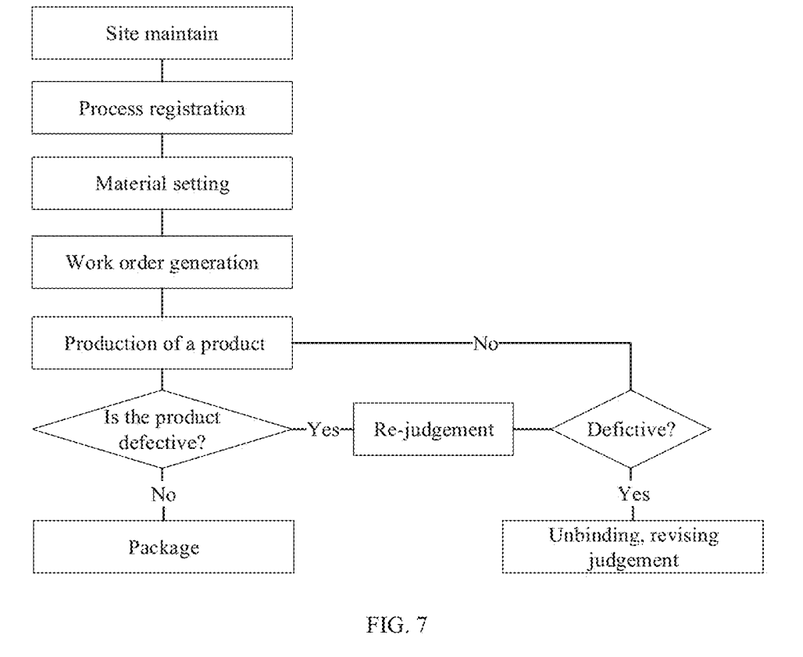
FIG. 7 is a flowchart illustrating another method for product production management according to an exemplary embodiment.
Figure 8:
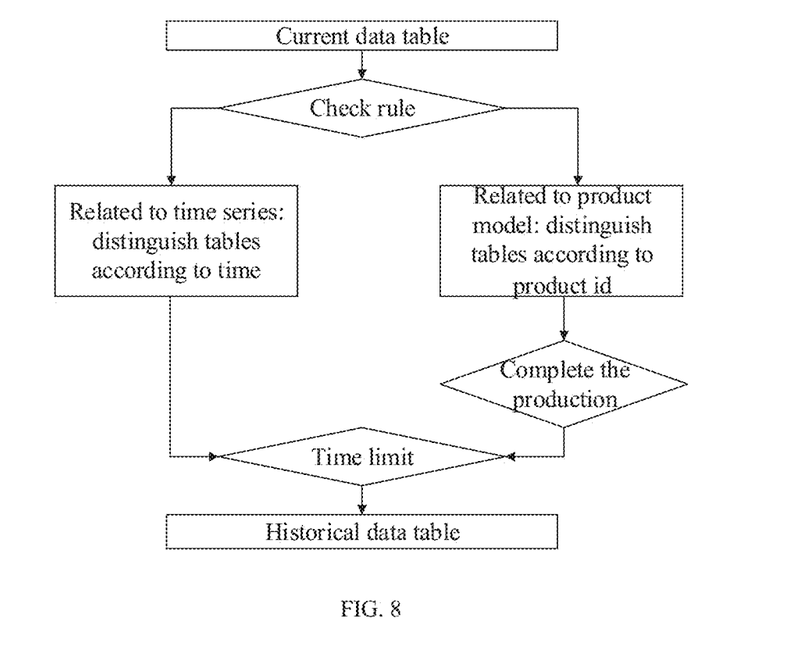
FIG. 8 is a flowchart illustrating yet another method for product production management according to an exemplary embodiment.

The working process of the system for product production management is described below in combination with FIGS. 6, 7 and 8, including:

The site device maintains the site in response to user operations, including product information binding such as process registration, material setting and work order generation. Then, the production process flow of the product is started, such as production process flow 1, production process flow 2, . . . , production process flow N, until the end of the production of the product. In each production process flow, sampling inspection is performed to check whether a product is a defective product. If the product is a good product, the product data will be packaged and stored in the current data table. If the product is defective, it will be re-judged. After the re-judgment, if the product is not defective, the production of the product will be continued; if the product is defective, unbinding materials and revising judgment will be performed, and the above data will be stored in the current data table.

The system can check the product data in the current data table to determine whether the product data is data related to time series or data related to product model. After the type is determined, the product data in the current data table is stored in the historical data table according to the time limit, so as to achieve the effect of precipitation of the product data.

In the traceability process, the current data table can be queried first, and when the query is successful, the query result can be fed back to the site device for display; when the traceability fails, the historical data table corresponding to the product ID data can be queried in the history data database, i.e., the data precipitation tank, and the query result can be returned.

Figure 9:
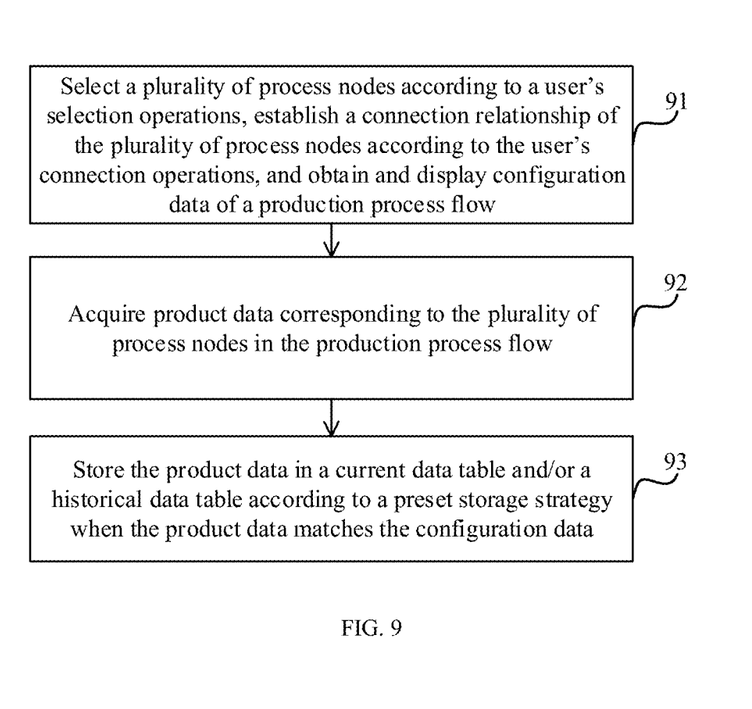
FIG. 9 is a flowchart illustrating a method for product production management according to an exemplary embodiment.

Based on the system for product production management shown in FIG. 1, one or more embodiments of the present disclosure also provide a method for product production management. Referring to FIG. 9, the method includes:

In step 91, a plurality of process nodes are selected according to a user's selection operations and a connection relationship of the plurality of process nodes is established according to the user's connection operations, and configuration data of a production process flow is obtained and displayed.

In step 92, product data corresponding to the plurality of process nodes in the production process flow is acquired.

In step 93, the product data is stored in a current data table and/or a historical data table according to a preset storage strategy when the product data matches the configuration data.

In an embodiment, storing the product data in the current data table and/or the historical data table according to the preset storage strategy includes:
  acquiring time of the product data is acquired; and
  simultaneously storing the product data in the current data table and the historical data table, and clearing data of a previous storage period in the current data table when a new storage period begins,
  where the current data table and the historical data table are both sized according to a set period, and the set period is greater than the storage period.

In an embodiment, storing the product data in the current data table and/or the historical data table according to the preset storage strategy includes:
  acquiring the product data and storing the product data in the current data table;
  determining whether production of a product has been completed according to the product data;
  determining a table name of a historical data table corresponding to product ID data of the product when the production of the product has been completed, where the completion of the production of the product means that all production process flows of a single product have been completed and all production process flows for a batch including the single product have been completed; and
  when set time is reached, storing the product data in the historical data table corresponding to the table name and deleting the product data from the current data table at the same time.

In an embodiment, determining the table name of the historical data table corresponding to the product ID data of the product includes:
  acquiring a first numerical value at a first preset position in the product ID data;
  converting the first numerical value to a second numerical value; and
  taking data at a second preset position in the second numerical value as a suffix of the historical data table, so as to obtain the historical data table corresponding to the product ID data.

In an embodiment, storing the product data in the current data table and/or the historical data table according to the preset storage strategy includes:
  reducing a storage period for deleting the product data from the current data table when data amount in a current current data table exceeds a first data amount threshold.

In an embodiment, the method further includes:
  when data amount in a current historical data table exceeds a second data amount threshold, changing a creation rule for creating a data table to increase a number of the historical data table; and reducing data amount corresponding to a single historical data table.

In an embodiment, the method further includes:
  in a product traceability process, querying for product data in the current data table according to product ID data; and querying a corresponding historical data table according to the product ID data and the preset storage strategy when the query fails, so as to obtain a traceability result.

In an embodiment, the method further includes:
  in a process of Working In Process (WIP) query, querying for product data corresponding to product ID data in the current data table.

In an embodiment, the method further includes:
  in a historical query process, querying for product data in the current data table according to query conditions, and returning the found product data; and
  when the product data is not found, determining a historical data table in which product data is included, querying for the product data in the historical data table according to the query conditions, and returning the product data.

It can be understood that the methods provided by the embodiments of the present disclosure correspond to the above-mentioned system, and for the specific content, the contents of respective embodiments of the system can be referred to, which will not be repeated here.

Figure 10:
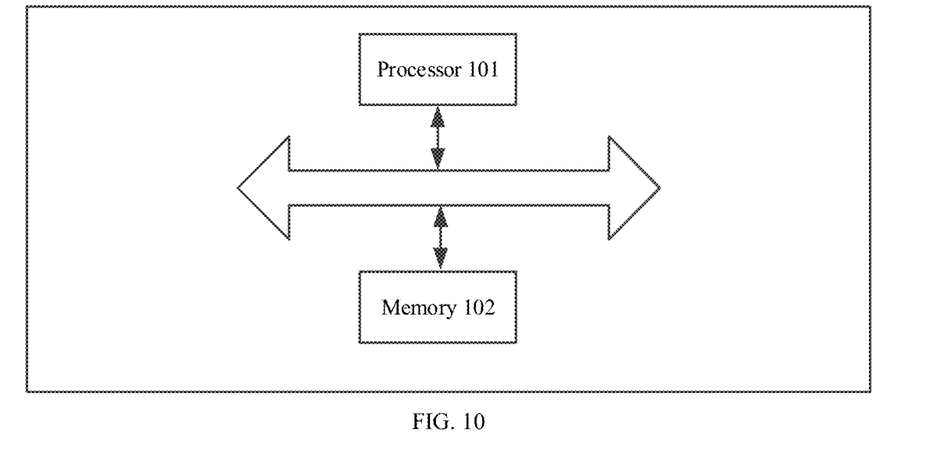
FIG. 10 is a block diagram of a server according to an exemplary embodiment.

In an exemplary embodiment, referring to FIG. 10, there is also provided a server, including:
  a processor 101; and
  a memory 102 configured to store a computer program executable by the processor;
  where the processor 101 is configured to execute the computer program in the memory 102 to implement the steps of the above-mentioned methods.

In an exemplary embodiment, there is also provided a computer readable storage medium, such as a memory including instructions, and the above-mentioned executable computer program can be executed by a processor to implement the steps of the above-mentioned method. The readable storage medium may be ROM, random access memory (RAM), CD-ROM, magnetic tape, floppy disk, optical data storage device, and the like.

Other embodiments of the present disclosure will be easily conceived of by those skilled in the art upon consideration of the specification and practice of the disclosure disclosed herein. The present disclosure is intended to cover any modifications, uses or adaptations that follow the general principles of the present disclosure and include common knowledge or customary technical means in the technical field not disclosed by the present disclosure. The specification and examples are to be regarded as exemplary only, with the true scope and spirit of the present disclosure are indicated by the following claims.

It should be understood that the present disclosure is not limited to the precise structures described above and illustrated in the accompanying drawings, and that various modifications and changes may be made without departing from the scope thereof. The scope of the present disclosure is limited only by the appended claims.

The invention claimed is:

1. A method for product production management, applied to an electronic device, comprising:

selecting, by a processor of the electronic device, a plurality of process nodes according to a user's selection operations and establishing, by the processor, connection relationship of the plurality of process nodes according to the user's connection operations, obtaining and displaying, by the processor, configuration data of a production process flow;

acquiring, by the processor, product data corresponding to the plurality of process nodes in the production process flow;

storing, by the processor, the product data in a current data table and/or a historical data table according to a preset storage strategy when the product data matches the configuration data; and in response to determining, by the processor, that data amount in a current historical data table stored in a memory exceeds a preset data amount threshold, changing a creation rule for creating a data table to increase a number of the historical data table; and reducing data amount corresponding to a single historical data table.

2. The method according to claim 1, wherein storing the product data in the current data table and/or the historical data table according to the preset storage strategy comprises:

acquiring time of the product data; and simultaneously storing the product data in the current data table and the historical data table, and clearing data of a previous storage period in the current data table when a new storage period begins, wherein the current data table and the historical data table are both sized according to a set period, and the set period is greater than the storage period.

3. The method according to claim 1, wherein storing the product data in the current data table and/or the historical data table according to the preset storage strategy comprises:

acquiring the product data and storing the product data in the current data table;

determining whether production of a product has been completed according to the product data;

determining a table name of a historical data table corresponding to product ID data of the product when the production of the product has been completed, wherein the completion of the production of the product means that all production process flows of a single product have been completed and all production process flows for a batch including the single product have been completed; and when set time is reached, storing the product data in the historical data table corresponding to the table name and deleting the product data from the current data table at the same time.

4. The method according to claim 3, wherein determining the table name of the historical data table corresponding to the product ID data of the product comprises:

acquiring a first numerical value at a first preset position in the product ID data;

converting the first numerical value to a second numerical value; and taking data at a second preset position in the second numerical value as a suffix of the historical data table, so as to obtain the historical data table corresponding to the product ID data.

5. The method according to claim 1, wherein storing the product data in the current data table and/or the historical data table according to the preset storage strategy comprises:

reducing a storage period for deleting the product data from the current data table when data amount in a current current data table exceeds a first data amount threshold.

6. The method of claim 1, further comprising:

in a product traceability process, querying for product data in the current data table according to product ID data; and querying a corresponding historical data table according to the product ID data and the preset storage strategy when the query fails, so as to obtain a traceability result.

7. The method of claim 1, further comprising:

in a process of Working In Process (WIP) query, querying for product data corresponding to product ID data in the current data table.

8. The method of claim 1, further comprising:

in a historical query process, querying for product data in the current data table according to query conditions, and returning the found product data; and when the product data is not found, determining a historical data table in which product data is included, querying for the product data in the historical data table according to the query conditions, and returning the found product data.

9. A non-transitory computer readable storage medium, wherein when an executable computer program in the non-transitory computer readable storage medium is executed by a processor of an electronic device, the method for product production management according to claim 1 is realized.

10. A server, comprising:

a processor; and a memory configured to store a computer program executable by the processor, wherein the processor is configured to execute the computer program in the memory to perform the following operations:

selecting a plurality of process nodes according to a user's selection operations, establishing a connection relationship of the plurality of process nodes according to the user's connection operations, and obtaining and displaying configuration data of a production process flow;

acquiring product data corresponding to the plurality of process nodes in the production process flow;

storing the product data in a current data table and/or a historical data table according to a preset storage strategy when the product data matches the configuration data; and in response to determining that data amount in a current historical data table stored in a memory exceeds a preset data amount threshold, changing a creation rule for creating a data table to increase a number of the historical data table; and reducing data amount corresponding to a single historical data table.

11. The server according to claim 10, wherein the processor performs storing the product data in the current data table and/or the historical data table according to the preset storage strategy when the product data matches the configuration data comprises:

acquiring time of the product data; and simultaneously storing the product data in the current data table and the historical data table, and clearing data of a previous storage period in the current data table when a new storage period begins, wherein the current data table and the historical data table are both sized according to a set period, and the set period is greater than the storage period.

12. The server according to claim 10, wherein the processor performs storing the product data in the current data table and/or the historical data table according to the preset storage strategy when the product data matches the configuration data comprises:
   acquiring the product data and storing the product data in the current data table;
   determining whether production of a product has been completed according to the product data;
   determining a table name of a historical data table corresponding to product ID data of the product when the production of the product has been completed, wherein the completion of the production of the product means that all production process flows of a single product have been completed and all production process flows for a batch including the single product have been completed; and
   when set time is reached, storing the product data in the historical data table corresponding to the table name and deleting the product data from the current data table at the same time.

13. The server according to claim 12, wherein the processor performs determining the table name of the historical data table corresponding to the product ID data of the product comprises:
   acquiring a first numerical value at a first preset position in the product ID data;
   converting the first numerical value to a second numerical value; and
   taking data at a second preset position in the second numerical value as a suffix of the historical data table, so as to obtain the historical data table corresponding to the product ID data.

14. The server according to claim 10, wherein the processor performs storing the product data in the current data table and/or the historical data table according to the preset storage strategy when the product data matches the configuration data comprises:
   reducing a storage period for deleting the product data from the current data table when data amount in a current current data table exceeds a first data amount threshold.

15. The server according to claim 10, wherein the processor is configured to execute the computer program to further perform:
   in a product traceability process, querying for product data in the current data table according to product ID data; and querying a corresponding historical data table according to the product ID data and the preset storage strategy when the query fails, so as to obtain a traceability result.

16. The server according to claim 10, wherein the processor is configured to execute the computer program to further perform:
   in a process of Working In Process (WIP) query, querying for product data corresponding to product ID data in the current data table.

17. The server according to claim 10, wherein the processor is configured to execute the computer program to further perform:
   in a historical query process, querying for product data in the current data table according to query conditions, and returning the found product data; and
   when the product data is not found, determining a historical data table in which product data is included, querying for the product data in the historical data table according to the query conditions, and returning the found product data.

* * * * *